United States Patent [19]

Frankhouse et al.

[11] Patent Number: 5,538,310
[45] Date of Patent: Jul. 23, 1996

[54] TRACK VISOR

[75] Inventors: Jay M. Frankhouse, Holland; Russell L. Clark, West Olive; Michael B. Vanden Elzen; R. Scott Anair, both of Holland; Chester R. Wisniewski, Grand Haven, all of Mich.

[73] Assignee: Prince Corporation, Holland, Mich.

[21] Appl. No.: 427,425

[22] Filed: Apr. 24, 1995

[51] Int. Cl.$^6$ .................................................. B60J 3/02
[52] U.S. Cl. ........................ 296/97.4; 296/97.11; 296/214
[58] Field of Search ...................... 296/97.4, 97.8, 296/97.11, 97.9, 97.1, 152, 214; 248/286, 298, 299

[56] References Cited

U.S. PATENT DOCUMENTS

| | | | |
|---|---|---|---|
| 1,399,356 | 12/1921 | Lytle. | |
| 1,969,887 | 8/1934 | Flanary | 296/97 |
| 2,477,680 | 8/1949 | Young. | |
| 2,829,920 | 4/1958 | Cohen | 296/97 |
| 2,932,539 | 4/1960 | Galbraith | 296/97 |
| 2,978,274 | 4/1961 | Ordman | 296/97 |
| 3,029,103 | 4/1962 | Horrocks | 296/97 |
| 3,122,393 | 2/1964 | Moody | 296/97 |
| 3,403,937 | 10/1968 | Quaine | 296/97 |
| 3,865,428 | 2/1975 | Chester | 296/97 G |
| 4,921,296 | 5/1990 | Gruber | 296/97.2 |
| 4,943,103 | 7/1990 | Rosen | 296/97.1 |
| 5,022,701 | 6/1991 | Thompson, II | 296/152 |
| 5,040,841 | 8/1991 | Yang | 296/97.6 |
| 5,056,854 | 10/1991 | Rosen | 296/97.11 |
| 5,067,765 | 11/1991 | Frye et al. | 296/97.8 |
| 5,205,604 | 4/1993 | Smith | 296/97.11 |
| 5,211,439 | 5/1993 | Smith et al. | 296/97.8 |
| 5,230,546 | 7/1993 | Smith et al. | 296/97.1 |
| 5,350,212 | 9/1994 | Corn | 296/97.11 X |
| 5,362,119 | 11/1994 | Rosentratter | 296/97.8 |

FOREIGN PATENT DOCUMENTS

| | | | |
|---|---|---|---|
| 1407244 | 6/1965 | France | 296/97.11 |
| 2620981 | 3/1989 | France. | |
| 3822378 | 1/1990 | Germany. | |
| 4014057 | 10/1991 | Germany. | |
| 62-110524 | 5/1987 | Japan | 296/97.1 |
| 446822 | 2/1992 | Japan. | |
| 567958 | 3/1945 | United Kingdom. | |
| 1387452 | 3/1975 | United Kingdom. | |

*Primary Examiner*—David M. Mitchell
*Assistant Examiner*—Kia M. Robinson
*Attorney, Agent, or Firm*—Price, Heneveld, Cooper, DeWitt & Litton

[57] ABSTRACT

A sliding visor includes a visor body with a slide extending within a track extending along the upper edge of the door frame and downwardly into the A-pillar. A storage pocket located at the end of the track receives the visor body for the unobtrusive storage of the visor when not in use. In an alternative embodiment of the present invention, a windshield mounted track visor is employed and includes a track concealably mounted behind the vehicle headliner above the windshield. The headliner includes a recess formed therein for receiving the visor for storage.

24 Claims, 4 Drawing Sheets

TRACK VISOR

BACKGROUND OF THE INVENTION

The present invention relates to a track visor and particularly to a track visor which can be moved to selected locations for blocking incident sunlight.

There exists a number of sliding visors mounted to a vehicle for movement along the windshield and side windows of a vehicle as. U.S. Pat. No. 3,403,937 is an example of one such visor. Such visors in the past have been relatively large panels and typically employed tracks to replace existent visors which are pivotally mounted to swing from the front windshield position to the side window position. Further, some visors have been proposed, such as disclosed in U.S. Pat. No. 4,921,296, in which relatively small panels are inserted into the side window slot of a door for blocking reflected light from a side view mirror. U.S. Pat. Nos. 5,205,604 and 5,211,439 disclose sliding visors which cooperate with the A-pillar of a vehicle and slide out from the headliner area to provide selective side window sun blocking protection.

Although there exists a variety of such sliding and track visors, there remains a need for providing a relatively compact visor which can be conveniently moved to pinpoint incident light and be readily adjustable to continue performing a sun blocking protection with changes in the vehicle orientation with respect to the incident light and yet be unobtrusively concealed for storage when not in use.

SUMMARY OF THE INVENTION

The visor system of the present invention satisfies these needs by providing a sliding visor panel which, in the first embodiment, is slidably mounted within a track extending along the upper edge of the door frame and downwardly adjacent the A-pillar and subsequently into a storage pocket for the unobtrusive storage of the visor when not in use. In an alternative embodiment of the present invention, a windshield visor is provided and includes a track concealably mounted behind the vehicle headliner above the windshield. In this embodiment, the headliner includes a recess formed therein for storing the visor, which may include an illuminated vanity mirror and is movable along selected positions of the windshield for providing incident light blocking as desired.

In each of the embodiments, a concealed track is provided and a visor panel slidably coupled within said track by means of a slide extending from the body of the visor to provide a compact and effective, easily used visor system. These and other features, objects and advantages of the present invention will become apparent upon reading the following description thereof, together with reference to the accompanying drawings.

DETAILED DESCRIPTION OF THE PREFERRED EMBODIMENT

Figure 1:
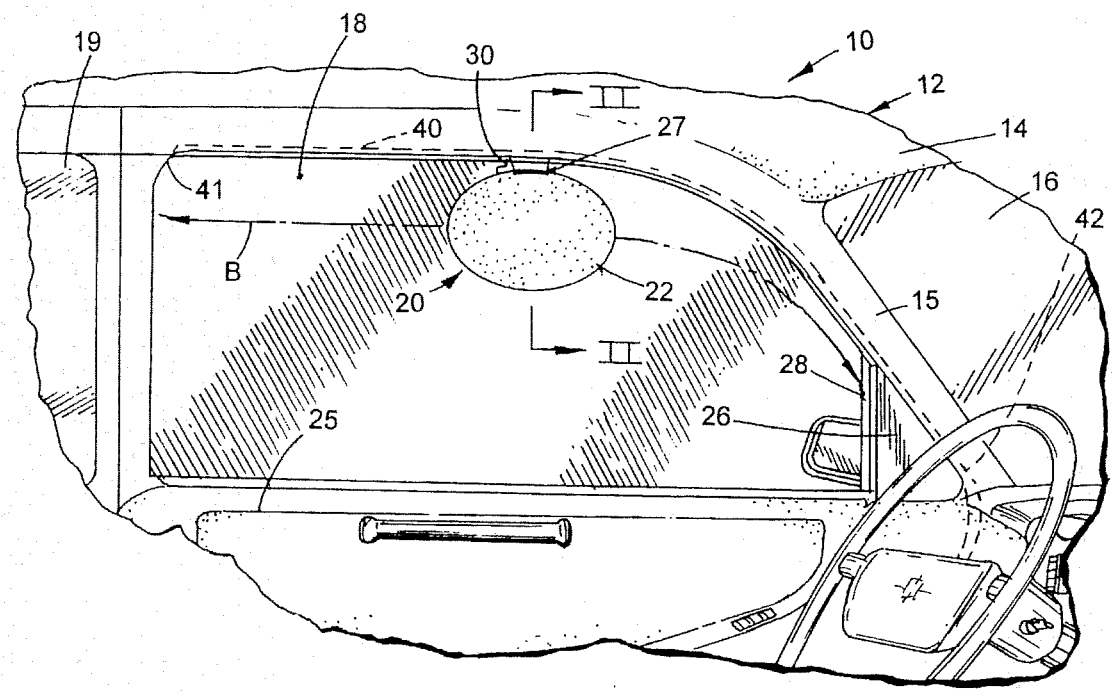
FIG. 1 is a fragmentary, perspective view of a vehicle showing a visor of a first embodiment of the present invention.

Referring initially to FIG. 1, there is shown a vehicle 10 having a visor assembly 20 of the first embodiment of the invention. Vehicle 10 includes a roof structure 12 covered by a preformed molded headliner assembly 14 positioned above vehicle glass such as a windshield 16 and the various side windows 18, 19. Visor assembly 20 comprises, as best seen in FIG. 2, a visor body 22 having a generally T-shaped slide 30 extending from an upper edge thereof into a captive track or channel 40 concealably mounted to the lower edge of the roof 12 and coupled to the roof 12 in a conventional manner as by employing recess fasteners, bonding adhesives, or the like.

Figure 3:
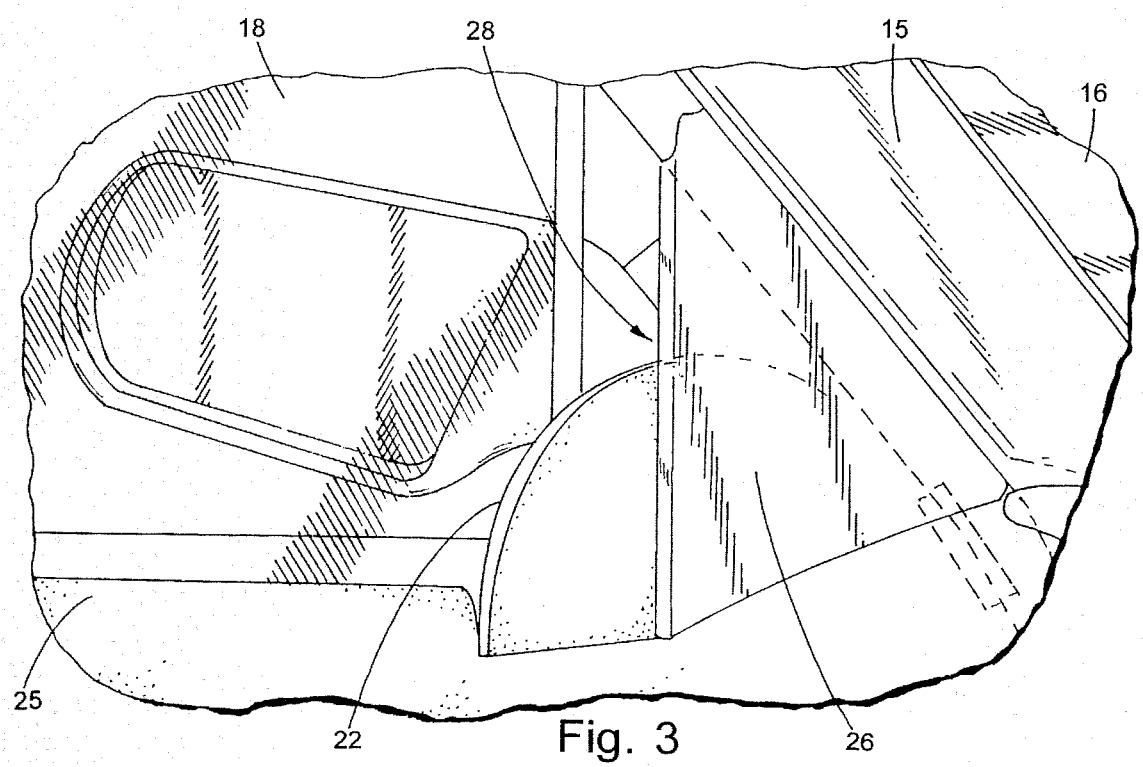
FIG. 3 is an enlarged, fragmentary, perspective view of the visor shown in FIGS. 1 and 2, shown in a stored position.
Figure 4:
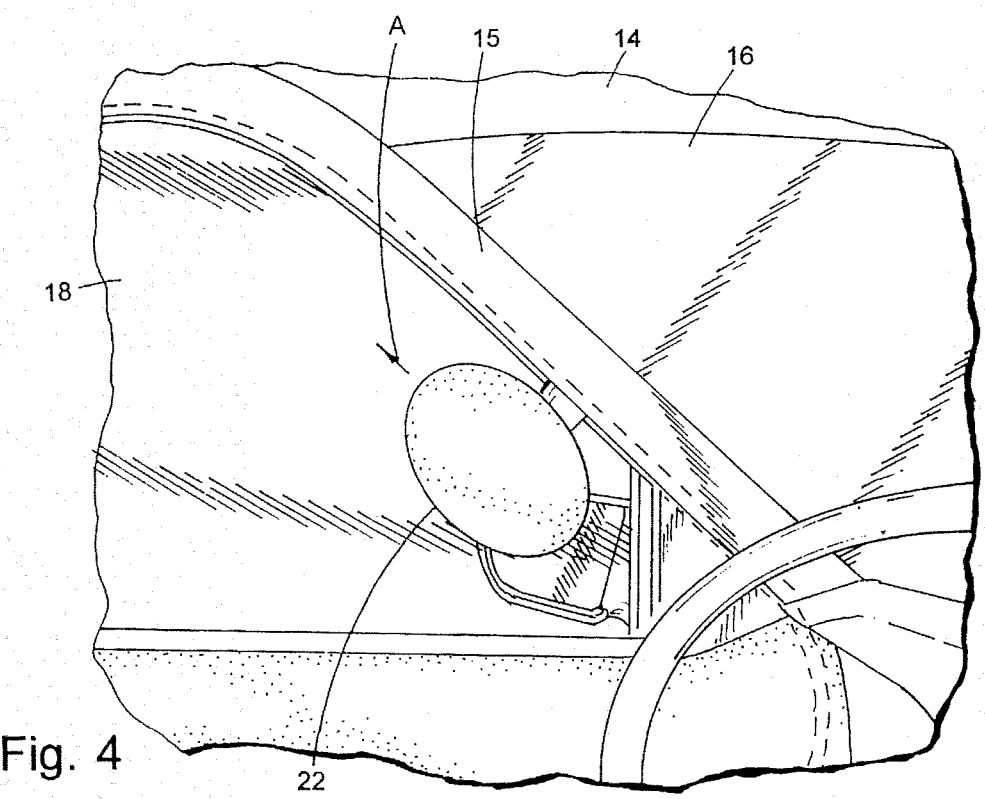
FIG. 4 is a reduced size, fragmentary, perspective view of the visor shown in FIGS. 1-3, shown removed from storage for movement to a selected position.

Track 40 extends from a first end 41 generally at the rear edge of the driver's side window 18 forwardly and then downwardly terminating at an end 42 which extends at the lower end of an A-pillar 15 between windshield 16 and side window 18. In the embodiment shown, the side window 18 extends directly upwardly from the driver's door 25. Track 40 is, therefore, mounted in the vehicle roof. In some automotive models, the door may include a window frame in which case track 40 would be mounted to the window frame to extend from the upper, left corner of the window to the lower, right corner. Most vehicles include a corner decorative trim panel 26 extending from the A-pillar 15 as shown. In the preferred embodiment of the present invention, a pocket 28 is formed behind decorative panel 26 to allow visor body 22 to extend within the pocket, as best seen in FIG. 3, for concealing at least a significant segment of the visor body 22 when in a stored, non-use position. A corner of the generally oval-shaped visor body 22 is exposed, as seen in FIG. 3, and allows the grasping of the visor body for its retraction in a direction indicated by arrow A in FIG. 4, such that the visor body 22 can be moved to any desired location as indicated by arrow B in FIG. 1 along track 40.

Figure 2:
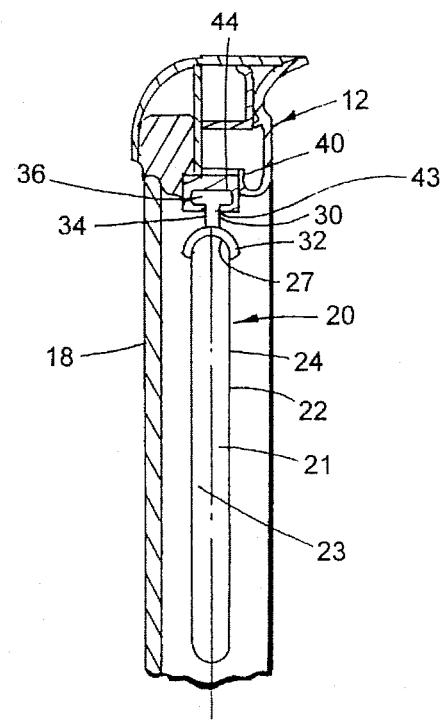
FIG. 2 is an enlarged, fragmentary, cross-sectional view taken along section lines II—II of FIG. 1.

The visor body 22 can be made of a suitable polymeric material or it can be a pair of upholstered panels made in a clam-shell construction including a first panel 21 and a second panel 23 covered by a suitable upholstery material 24, as seen in FIG. 2. Slide 30 extending from the top edge of the visor body comprises, as best seen in FIG. 2, a cap 32 which engages and is affixed to the upper edge 27 of visor body 22 and includes a vertically extending post 34 terminating in a cross member 36 defining the T-shaped slide. Preferably, slide 30 is made of a lubricous polymeric material, such as acetal, and can be affixed to the upper edge 27 of visor body 22 by, for example, compression molding the cap 32 directly to the visor body.

Track 40 is extruded from a lubricous polymeric material defining a cross-sectional, T-shaped slot with dimensions slightly greater than the T-shaped slide 30. Track 40 includes an opening 43 (FIG. 2) for receiving the post 34 of slide 30 and which communicates with a generally rectangular opening 44 for receiving the cross member 36 of the slide. The width of cross member 36, as viewed in FIG. 1, is sufficiently narrow to allow the slide to easily follow the curved track 40 when moved from the upper portion along the top of door 25 downwardly along the A-pillar 15. Although in the preferred embodiment of the invention, the slide 30 is a rigid member holding visor assembly 20 in a plane generally parallel to the side window 18, as seen in FIG. 2, the post 34 may include an articulated section to allow pivoting of the visor body 22 toward and away from the side window 18, if desired.

Figure 5:
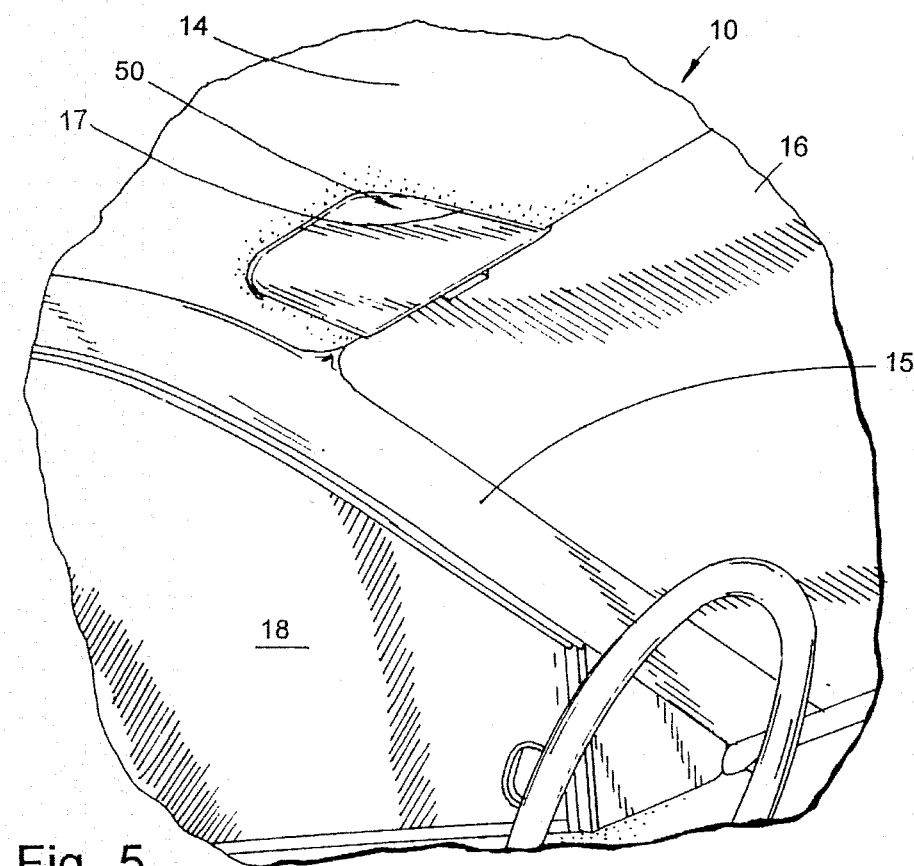
FIG. 5 is a fragmentary, perspective view of the vehicle showing an alternative embodiment of a track visor of the present invention, shown in a stored position.
Figure 6:
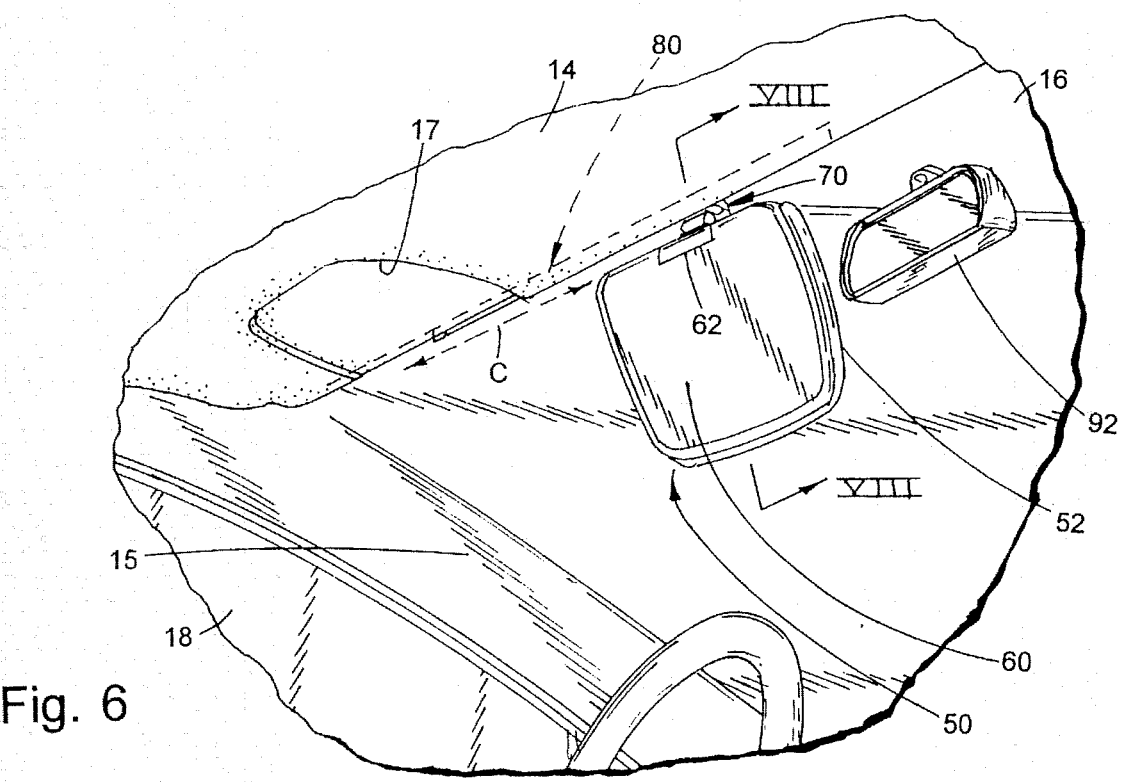
FIG. 6 is a fragmentary, perspective view of the visor shown in FIG. 5, shown in a lowered use position and moved to one side of the storage recess in the headliner.
Figure 7:
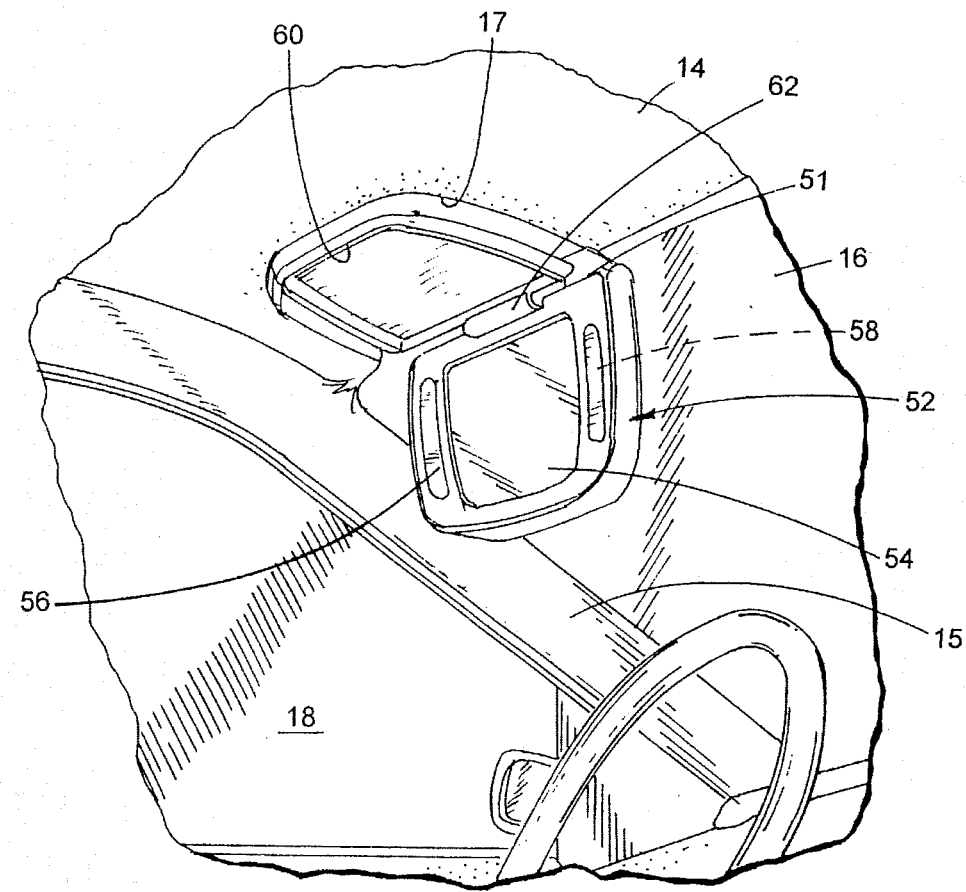
FIG. 7 is a fragmentary, perspective view of the visor shown in FIGS. 5 and 6, shown with its cover open to expose an illuminated vanity mirror.

An alternative embodiment of the invention is seen in FIGS. 5–8 in which a second visor assembly 50 is shown mounted above the windshield 16 of vehicle 10 and is storably mounted within a rectangular recess 17 (FIG. 7) in headliner 14, as best seen in FIG. 5. The visor assembly 50 includes a visor body 52 which may include a vanity mirror 54 mounted within the visor body and including illumination means having lens 56, 58 on opposite sides of mirror 54. Lamps positioned behind lens 56, 58 are coupled to the vehicle's electrical system utilizing conventional wiring and a sliding contact arrangement which can be conventional for applying electrical operating power to the illumination means for mirror 54. A cover 60 can be hingedly mounted by means of a spring hinge assembly 62 to the upper edge 51 of visor body 52 for selectively covering the visor, as seen in FIG. 6, or uncovering the visor body, as seen in FIG. 7, for use of the illuminated vanity mirror associated with the visor.

Figure 8:
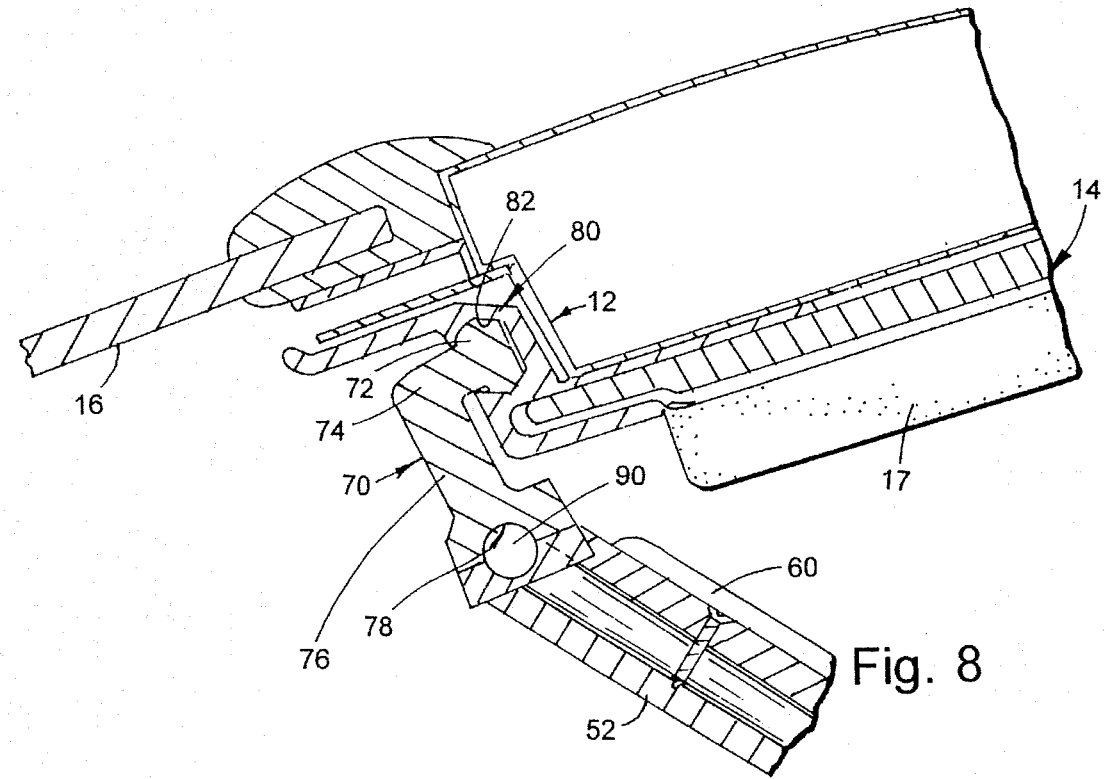
FIG. 8 is an enlarged, fragmentary, cross-sectional view of the visor taken along section lines VIII—VIII of FIG. 6.

As best seen in FIG. 8, a slide assembly 70 slidably couples visor body 52 to a track 80 mounted above the headliner 14 and to the sheet metal roof assembly 12 of the vehicle at the interface between the headliner 14 and windshield 16. Track 80, like track 40, can be an extruded, lubricous polymeric material defining an elongated socket 82 for slidably receiving slide 70 which has a head 72 which can be snap fitted within the track 80 and captively, but slidably, held therein for movement along the track as indicated by arrow C in FIG. 6. Slide 70 is a generally inverted L-shaped member having a shortened leg 74 extending between head 72 and a downwardly depending leg 76, terminating in a pivot socket 78 for pivotally mounting the visor body 52 to slide 70. For such purpose, a pivot rod 90 extends within socket 78 and is coupled in spaced relationship to the upper edge of integrally molded visor body 52 to allow the visor body to pivot between the stored position shown in FIG. 5 to various lowered use positions, as illustrated in FIGS. 6 and 7.

Track 80, as best seen in FIG. 6 in phantom form, extends from the A-pillar 15 along the front windshield area, preferably to at least the center line of the vehicle above the rear view mirror 92. This permits the relatively small visor to be compactly mounted within a recess 17 in the vehicle headliner 14 and provide an illuminated vanity mirror as well as sun blocking protection by providing protection only where necessary for blocking incident light. The size of visor assembly 50, and particularly the visor body 52, can be significantly smaller than that of a conventional visor extending from the center of the windshield area toward the A-pillar inasmuch as the visor can be selectively moved along the track 80 to block out high intensity incident light. A visor so defined further provides the function of a convenient, illuminated vanity mirror assembly as well as being pivotable about pivot axis 90 to allow the visor to pivot between a raised stored position and selected lowered use positions. For such purpose, the diameter of pivot rod 90 and socket 78 are selected to provide the desired rotational torque for holding the visor in a selected, adjusted use position. Power for the illuminated vanity mirror lamps can be supplied by a pair of conductors extending within track 80 and pick up contacts extending within slide 70 to provide continuous operating power for the visor assembly illuminated vanity mirror for use of the mirror under low ambient light conditions.

Thus, with both embodiments of the present invention, a track visor system is employed in which a relatively small visor body is slidably movable along a track extending along at least the upper portion of a vehicle window and movable into a storage pocket for storage of the visor when not in use. The resultant visor construction provides the desired sun blocking of incident light and yet provides a relatively compact visor system which is particularly suitable for relatively modern vehicle designs in which space is at a premium.

It will become apparent to those skilled in the art that various modifications to the preferred embodiment of the invention can be made without departing from the spirit and scope thereof as defined by the appended claims.

The embodiments of the invention in which an exclusive property or privilege is claimed are defined as follows.

1. A track visor for a vehicle comprising:

a track for mounting to a vehicle roof and having a length for extending along the top edge of a side window and downwardly along a support pillar of the vehicle;

a visor body;

a slide coupling said visor body to said track for slidable movement along said track; and a pocket formed at one end of said track for receiving at least a portion of said visor body for storage when not in use.

2. A track visor for a vehicle comprising:

a track for mounting to a vehicle roof and having a length which extends along a top edge of a side window of a vehicle and terminates at a lower corner of an A-pillar of a vehicle;

a visor body;

a slide coupling said visor body to said track for slidable movement along said track; and a pocket formed at one end of said track for receiving at least a portion of said visor body for storage when not in use.

3. The visor as defined in claim 2 wherein said track is made of a lubricous polymeric material.

4. The visor as defined in claim 3 wherein said slide includes a first end mounted to said visor body and an opposite end slidably mounted within said track.

5. The visor as defined in claim 4 wherein said opposite end of said slide is generally T-shaped.

6. The visor as defined in claim 5 wherein said visor body is generally oval.

7. A visor and headliner system comprising:

a vehicle roof having a downwardly extending forward edge adjacent a windshield, a vehicle headliner attached to said roof and having a storage recess formed therein adjacent a front edge of said headliner on a side of said headliner facing the interior of a vehicle, said storage recess having a boundary edge extending adjacent to and away from the front edge of said headliner and shaped to outline a peripheral edge of a visor;

a concealed track mounted to said downwardly extending forward edge of the roof;

a slide having one end slidably mounted within said track and an opposite end; and a visor pivotally mounted to said opposite end of said slide, said visor having a peripheral edge, said visor movable between a stored position in which said peripheral edge is aligned within said boundary edge of said recess such that said visor is substantially flush with said headliner, and use positions pivoted from said storage recess.

8. The system as defined in claim 7 wherein said visor includes an illuminated vanity mirror.

9. The system as defined in claim 8 wherein said visor includes a cover pivotally mounted thereto for selectively covering said illuminated vanity mirror.

10. The system as defined in claim 9 wherein said visor has a generally rectangular shape and said recess within said headliner is generally rectangular to receive said visor therein.

11. The system as defined in claim 10 (wherein said track has a length sufficient to extend from an A-pillar area of a vehicle toward at least the center of the vehicle.

12. A visor and headliner system comprising:

a vehicle headliner having a storage recess formed therein adjacent a front edge of said headliner on a side of said headliner facing the interior of the vehicle, said storage recess having a boundary edge extending adjacent to and away from said track and shaped to outline a peripheral edge of a visor;

a first track mounted behind said front edge of said headliner;

a first slide having one end slidably mounted within said track and an opposite end;

a first visor mounted to said opposite end of said first slide;

a second track for mounting to a vehicle roof and having a length for extending along the top edge of a side window and downwardly along a support pillar of the vehicle;

a second visor having a peripheral edge, said second visor movable between a stored position in which said peripheral edge is aligned within said boundary edge of said recess such that said second visor is substantially flush with said headliner, and use positions pivoted from said storage recess; and a second slide coupling said second visor to said second track for slidable movement along said second track.

13. A visor and headliner system comprising:

a vehicle headliner having a recess formed therein adjacent a front edge of said headliner on a side of said headliner facing the interior of the vehicle;

a first track mounted behind said front edge of said headliner;

a first slide having one end slidably mounted within said track and an opposite end;

a first visor mounted to said opposite end of said first slide;

a second track for mounting to a vehicle roof and having a length for extending along the top edge of a side window and downwardly along a support pillar of the vehicle and wherein said second track terminates at the lower corner of the support pillar of the vehicle;

a second visor; and a second slide coupling said second visor to said second track for slidable movement along said second track.

14. The system as defined in claim 13 wherein said first and second tracks are made of a lubricous polymeric material.

15. The system as defined in claim 14 wherein said second slide includes a first end captively engaging said second visor and an opposite end slidably mounted within said second track.

16. The system as defined in claim 15 (wherein said opposite end of said second slide is generally T-shaped.

17. The system as defined in claim 16 wherein said second visor is generally oval.

18. The system as defined in claim 12 wherein said first visor is pivotally coupled to said opposite end of said first slide.

19. The system as defined in claim 18 wherein said first visor includes an illuminated vanity mirror.

20. The system as defined in claim 19 wherein said first visor includes a cover pivotally mounted thereto for selectively covering said illuminated vanity mirror.

21. The system as defined in claim 12 wherein said first visor has a generally rectangular shape and said recess within said headliner is generally rectangular to receive said first visor therein.

22. A visor and headliner for a vehicle having a roof with a downwardly extending forward edge adjacent a vehicle glass, said visor and headliner comprising:

a headliner for a vehicle including a recess formed along a front edge of said headliner therein, said recess being in the shape of a visor;

a track adapted to be mounted to a downwardly extending forward edge of said roof and said headliner, extending along the top edge of a vehicle glass adjacent said recess;

a visor; and a slide coupling said visor to said track for slidable movement along said track and pivotal movement for storage within said recess and flush with a surface of said headliner facing the interior of the vehicle.

23. The visor as defined in claim 22 wherein said track is made of a lubricous polymeric material.

24. The visor as defined in claim 22 wherein said track extends along a top edge of the said vehicle glass is a windshield of the vehicle.

* * * * *

UNITED STATES PATENT AND TRADEMARK OFFICE
CERTIFICATE OF CORRECTION

PATENT NO.  : 5,538,310
DATED       : July 23, 1996
INVENTOR    : Frankhouse et al.

It is certified that error appears in the above-identified patent and that said Letters Patent is hereby corrected as shown below:

Column 1, line 10;

Delete "as".

Column 5, line 19;

"(wherein" should be --wherein--.

Column 6, Line 18;

"(wherein" should be --wherein--.

Column 6, lines 52 and 53;

Delete "said track . . . edge of the".

Signed and Sealed this

Twenty-second Day of October, 1996

Attest:

BRUCE LEHMAN

Attesting Officer      Commissioner of Patents and Trademarks